United States Patent
Kim et al.

(10) Patent No.: US 10,567,653 B2
(45) Date of Patent: Feb. 18, 2020

(54) METHOD OF MAINTAINING TILT ANGLE, METHOD OF CONTROLLING TILTING, AND SURVEILLANCE CAMERA

(71) Applicant: HANWHA TECHWIN CO., LTD., Changwon-si (KR)

(72) Inventors: Dae Bong Kim, Changwon-si (KR); Cheol Ho Kim, Changwon-si (KR); Young Mi Kim, Changwon-si (KR); Sang Hyun Cho, Changwon-si (KR); Jong In Park, Changwon-si (KR)

(73) Assignee: HANWHA TECHWIN CO., LTD., Changwon-si (KR)

(*) Notice: Subject to any disclaimer, the term of this patent is extended or adjusted under 35 U.S.C. 154(b) by 0 days.

(21) Appl. No.: 15/933,270

(22) Filed: Mar. 22, 2018

(65) Prior Publication Data

US 2019/0182425 A1 Jun. 13, 2019

(30) Foreign Application Priority Data

Dec. 11, 2017 (KR) .......................... 10-2017-0169527

(51) Int. Cl.
*H04N 7/18* (2006.01)
*H04N 5/232* (2006.01)

(52) U.S. Cl.
CPC ..... *H04N 5/23258* (2013.01); *H04N 5/23267* (2013.01); *H04N 5/23287* (2013.01)

(58) Field of Classification Search
CPC .. H04N 7/18; H04N 5/23258; H04N 5/23267; H04N 5/23287
USPC .................. 348/143, 159, 222.1, 333.01, 372
See application file for complete search history.

(56) References Cited

U.S. PATENT DOCUMENTS

| 7,600,929 B2 | 10/2009 | Kim et al. |
| 7,750,937 B2* | 7/2010 | Ito .......................... H04N 7/183 348/143 |
| 7,868,911 B2* | 1/2011 | Park ...................... H04N 7/183 348/143 |

(Continued)

FOREIGN PATENT DOCUMENTS

| JP | 9-266547 | 10/1997 |
| JP | 11-341335 | 12/1999 |

(Continued)

OTHER PUBLICATIONS

Extended European Search Report dated Jan. 9, 2019, issued in European Patent Application No. 18174739.

*Primary Examiner* — Trang U Tran
(74) *Attorney, Agent, or Firm* — H.C. Park & Associates, PLC

(57) ABSTRACT

A method of rotating a surveillance camera having an acceleration sensor and being controllable by a processor to maintain a tilt-angle to conform to a command tilt-angle, includes the steps of moving the surveillance camera tilt to a predetermined command tilt-angle in response to a signal from the processor; periodically calculating estimated tilt-angles by using acceleration values in at least one axis of an acceleration sensor; calculating a difference value between an estimated tilt-angle of a current period and an estimated tilt-angle of a previous period; and when the difference value between the estimated tilt-angles exceeds a set limit, moving the camera to another position to correct the tilt angle according to the difference calculate.

19 Claims, 14 Drawing Sheets

(56) References Cited

U.S. PATENT DOCUMENTS

| | | | |
|---|---|---|---|
| 8,390,686 B2* | 3/2013 | Tanaka | G08B 13/19602 348/143 |
| 8,610,821 B2* | 12/2013 | Kawaguchi | H04N 5/232 348/372 |
| 2007/0085028 A1 | 4/2007 | Waibel et al. | |
| 2011/0115908 A1 | 5/2011 | Tatsuno | |
| 2011/0261196 A1 | 10/2011 | Gabel | |
| 2012/0317825 A1 | 12/2012 | Ohta | |
| 2014/0111643 A1 | 4/2014 | Yang | |
| 2014/0253788 A1 | 9/2014 | Saito et al. | |
| 2015/0363627 A1 | 12/2015 | Isozumi et al. | |
| 2017/0257558 A1 | 9/2017 | Yokoyama et al. | |

FOREIGN PATENT DOCUMENTS

| | | |
|---|---|---|
| JP | 2000-338534 | 12/2000 |
| JP | 3131099 | 1/2001 |
| JP | 2011-166336 | 8/2011 |
| JP | 2014-171344 | 9/2014 |
| JP | 6080065 | 2/2017 |
| KR | 10-2005-0111223 | 11/2005 |
| KR | 10-0708470 | 4/2007 |
| KR | 10-0844638 | 7/2008 |
| KR | 10-0927323 | 11/2009 |
| KR | 10-2010-0049917 | 5/2010 |
| KR | 10-1069184 | 9/2011 |
| KR | 10-1424151 | 8/2014 |
| WO | 2017082509 | 5/2017 |

* cited by examiner

METHOD OF MAINTAINING TILT ANGLE, METHOD OF CONTROLLING TILTING, AND SURVEILLANCE CAMERA

CROSS REFERENCE TO RELATED APPLICATION

This application claims priority from and the benefit of Korean Patent Application No. 10-2017-0169527, filed on Dec. 11, 2017, which is hereby incorporated by reference for all purposes as if fully set forth herein.

BACKGROUND

Field

Exemplary embodiments of the invention relate generally to a method of maintaining a tilt angle, a method of controlling tilting, and a surveillance camera, and more specifically, to a method of maintaining a tilt-angle and a method of controlling tilting of a surveillance camera capable of performing a tilting operation by using an open loop control method.

Discussion of the Background

When controlling a tilting operation of a surveillance camera, an open loop control method or a closed loop control method may be used.

In a closed loop control method, returning is controlled by an encoder, etc., to detect and correct an out-of-phase state of tilting. However, when the tilting is performed by employing the closed loop control method, an expensive location detecting device such as an encoder has to be used, thereby increasing manufacturing costs of the surveillance camera.

Accordingly, most surveillance cameras adopt an open loop control method while using a stepping motor. However, when the open loop control method is used as described above, the surveillance camera may not instantly detect and correct for variation in a tilt-angle due to gravity, vibrations, wind, heat, etc. as time passes after finishing the tilting operation. In this case, a region that is not desired by a user is monitored for a while, and thus, a gap in surveillance occurs.

The above information disclosed in this Background section is only for understanding of the background of the inventive concepts, and, therefore, it may contain information that does not constitute prior art.

SUMMARY

Exemplary embodiments of the invention use an open loop control method capable of maintaining a tilt-angle, instantly (in real time) detect and correct a variation in the tilt-angle due to gravity, vibration, wind, heat, etc. when a time period has passed after tilting a surveillance camera to a desired angle occurs. Other embodiments provide a method of controlling tilting by using the above method and a surveillance camera system employing one or more of the inventive open loop control methods.

Additional aspects will be set forth in part in the description which follows and, in part, will be apparent from the description, or may be learned by practice of the presented embodiments.

According to one or more embodiments, a method of rotating a surveillance camera having an acceleration sensor and being controllable by a processor to maintain a tilt-angle to conform to a command tilt-angle, the method includes: (a) moving the surveillance camera to a predetermined command tilt-angle in response to a signal from the processor; (b) periodically calculating in the processor estimated tilt-angles by using acceleration values in at least one axis of an acceleration sensor; (c) calculating a difference between an estimated tilt-angle of a current period and an estimated tilt-angle of a previous period; and (d) when the difference between the estimated tilt-angles exceeds a set limit value, moving the camera to another position to correct the tilt angle according to the difference calculated in step (c).

The surveillance camera may further include a gyro sensor to detect whether the camera is shaking, in which case, the method may further include the steps of: (e) sending signals from the gyro sensor to the processor to monitor whether the camera is shaking; and (f) performing steps (c) and (d) only when the processor determines that the surveillance camera is not shaking.

The step (b) may further include steps of: (b1) breading acceleration values from the acceleration sensor, in each time period; (b2) performing noise filtering on the acceleration values from the acceleration sensor; (b3) calculating tilt-angles corresponding to the acceleration values; (b4) performing an offset correction on calculated tilt-angles; and (b5) obtaining, as the estimated tilt-angle, an average of the calculated tilt-angles.

An offset value for performing the step (b4) may be calculated by the processor before the operation of tilting the camera to the command tilt-angle.

The step (b) may also include steps: (b1) reading acceleration values from the acceleration sensor, in each time period; (b2) performing noise filtering on the acceleration values from the acceleration sensor; (b3) calculating tilt-angles corresponding to the acceleration values; and (b4) calculating an average angle of the calculated tilt-angles as the estimated tilt-angle.

The acceleration values in an X-axis, a Y-axis, and a Z-axis may be generated by the acceleration sensor, wherein an acceleration in the Z-axis is equal to an acceleration of gravity when the command tilt-angle is 0 and the acceleration sensor is configured to rotate about the X-axis or the Y-axis as a rotational axis due to the tilting operation.

The acceleration values in an X-axis, a Y-axis, and a Z-axis may also be generated by the acceleration sensor, the acceleration sensor is provided to rotate about the X-axis as a rotational axis due to the tilting operation, the command tilt-angle may include a first range or a second range of angles.

In step (b), the estimated tilt-angle may be calculated according to the acceleration values in the Y-axis when the command tilt-angle is within the first range, and the estimated tilt-angle may be calculated according to the acceleration values in the Z-axis when the command tilt-angle is within the second range.

According to one or more embodiments, a method of controlling tilting of a surveillance camera having an acceleration sensor and being controllable by a processor to tilt the camera to a command tilt-angle and to control an actual tilt-angle to conform to the command tilt-angle, the method includes steps of: (a), tilting the camera to the command tilt-angle while monitoring whether the operation of tilting to the command tilt-angle is performed by using a photo-interrupt sensor; (b), after moving the surveillance camera to the predetermined command tilt-angle in response to a signal from the processor, periodically calculating an estimated tilt-angle by using acceleration values in at least one axis of an acceleration sensor; (c), calculating a difference between an estimated tilt-angle of a current period and an estimated tilt-angle of a previous period; and (d), when the difference between the estimated tilt-angles exceeds a set limit value, moving the camera to another position for correcting the tilt-angle according to the difference calculated in step (c).

The photo-interrupt sensor used in step (a) may include: a light-emitting device configured to irradiate light in a first direction; a photo detecting device configured to rotate due to the tilting operation; and a disc located between the light-emitting device and the photo detecting device in the first direction, and including first regions configured to transmit light from the light-emitting device and second regions configured to block the light from the light-emitting device; the photo detecting device may be configured to output logic high signals and logic low signals to the processor by passing through the first regions and the second regions while rotating due to the tilting operation.

A reference tilt-angle may be set according to a location of an end in each of the first regions and the second regions, and a tilt-angle range of each of the first regions and the second regions may be set differently from the others.

The lengths of the first regions and the second regions may be different from one another.

The step (a) may further include performing a correction control when a difference between a reference tilt-angle according to the tilting process and an accumulated tilt-angle in a current period is greater than a reference difference at a time point of detecting that the photo detecting device is positioned at the location of the end in each of the first regions and the second regions.

The method may further include the steps of searching for the location of the end in one of the first regions and the second regions by using a combination of an additional forward tilting and an additional backward tilting; and setting a reference tilt-angle according to a found location of the end as the accumulated tilt-angle in the current period.

The step (b) may further include the steps of: (b1) reading acceleration values from the acceleration sensor, in each time period; (b2) performing noise filtering on the acceleration values from the acceleration sensor; (b3) calculating tilt-angles corresponding to the acceleration values; and (b4) calculating an average angle of the calculated tilt-angles as the estimated tilt-angle.

The acceleration values in an X-axis, a Y-axis, and a Z-axis may be generated by the acceleration sensor, the acceleration sensor may be configured to rotate about the X-axis as a rotational axis due to the tilting operation, the command tilt-angle may include a first range or a second range;

In step (b), the estimated tilt-angle may be calculated according to acceleration values in the Y-axis when the command tilt-angle is within the first range, and the estimated tilt-angle is calculated according to acceleration values in the Z-axis when the command tilt-angle is within the second range.

According to yet another embodiment, a surveillance camera system may include: a surveillance camera having an acceleration sensor; a processor to generate signals to rotate the camera to a predetermined tilt angle, wherein the processor is configured to: (a) after moving the surveillance camera tilt to a predetermined command tilt-angle in response to a signal from the processor, periodically calculate in the processor estimated tilt-angles by using acceleration values in at least one axis of the acceleration sensor; (b) calculate a difference between an estimated tilt-angle of a current period and an estimated tilt-angle of a previous period; and (c) when the difference between the estimated tilt-angles exceeds a set limit value, generate a signal to move the camera to another position for correcting the tilt angle according to the difference calculated in step (b).

The surveillance camera may further include a gyro sensor configured to detect whether the camera is shaking, and further comprising the steps of (d) sending signals from the gyro sensor to the processor to monitor whether the camera is shaking; and (e) performing steps (b) and (c) only when the processor determines that the surveillance camera is not shaking.

The step (a) may further include: (a1) reading acceleration values from the acceleration sensor, in each time period; (a2) performing noise filtering on the acceleration values from the acceleration sensor; (a3) calculating tilt-angles corresponding to the acceleration values; (a4) calculating an average angle of the calculated tilt-angles as the estimated tilt-angle.

The surveillance camera system may further include a photo-interrupt sensor including a light-emitting device to irradiate light in a first direction; a photo detecting device rotatable due to the tilting operation; and a disc located between the light-emitting device and the photo detecting device in the first direction, and including first regions to transmit light from the light-emitting device and second regions to block the light from the light-emitting device, the photo detecting device may be configured to output logic high signals and logic low signals to the processor by passing through the first regions and the block regions while rotating due to the tilting operation.

According to the methods of maintaining the tilt-angle or the method of controlling tilting according to embodiments of the invention, the tilt-angle after finishing the tilting may be monitored and maintained by using acceleration values in at least one axis of the acceleration sensor.

Accordingly, in the surveillance camera performing the tilting operation by using the open loop control method according to embodiments of the invention, a variation in the tilt-angle due to gravity, vibration, wind, heat, etc. as time passes after finishing the tilting operation may be instantly (in real time) detected and corrected.

In addition, most of surveillance cameras include a gyro sensor for detecting and correcting shaking of the camera during imaging. In most cases, the gyro sensor itself is not sold, but is sold with the acceleration sensor as the speed sensor. Therefore, since the method of maintaining the tilt-angle or the method of controlling the tilting according to the embodiment uses the acceleration sensor included in the speed sensor with the gyro sensor, it is economically efficient.

Additionally, according to the method of controlling tilting in accordance with the principles of the invention and exemplary embodiments, in a surveillance camera performing the tilting operation by employing an open loop control method, the tilting operation to the command tilt-angle may be normally performed by using the photo-interrupt sensor that is in-expensive. Additional features of the inventive concepts will be set forth in the description which follows, and in part will be apparent from the description, or may be learned by practice of the inventive concepts.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
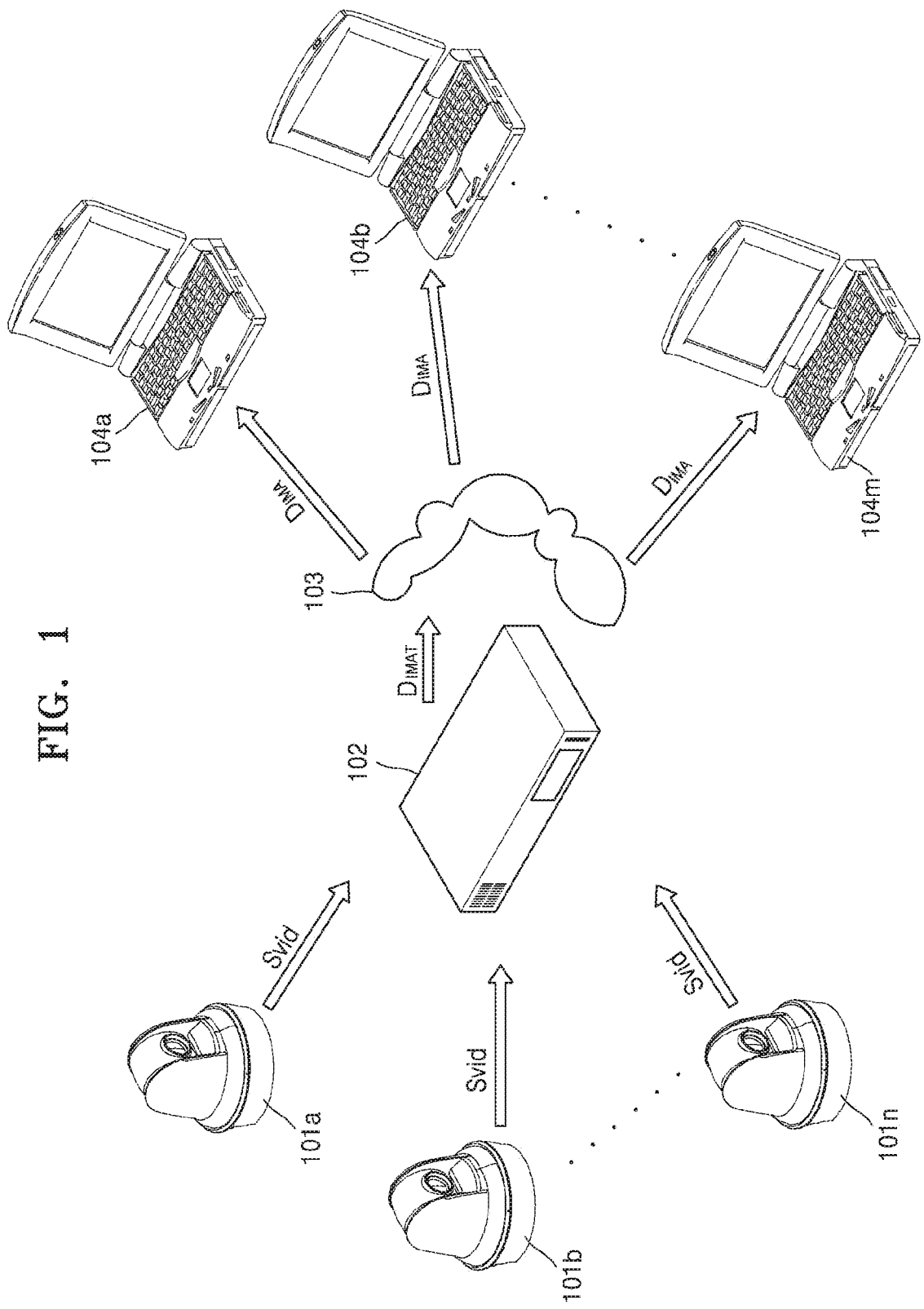
FIG. 1 is a diagram of a surveillance system employing surveillance cameras, according to an exemplary embodiment of the invention.

In the following description, for the purposes of explanation, numerous specific details are set forth in order to provide a thorough understanding of various exemplary embodiments or implementations of implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

FIG. 1 is a diagram of a surveillance system employing surveillance cameras 101a to 101n according to an exemplary embodiment of the disclosure.

Referring to FIG. 1, the surveillance cameras 101a to 101n of the illustrated embodiment transmit analog video signals Svid obtained through imaging as is known in the art to a digital video recorder 102.

The digital video recorder 102 converts analog video signals Svid from the surveillance cameras 101a to 101n into digital video data $D_{IMAT}$, stores the digital video data $D_{IMAT}$ as a result of the conversion, and transmits the digital video data $D_{IMAT}$ to client terminals 104a to 104m via Internet 103.

In FIG. 1, the reference letter $D_{IMAT}$ denotes the digital video data transmitted from the digital video recorder 102 to the Internet 103, and a reference letter $D_{IMA}$ denotes digital video data transmitted to each of the client terminals 104a to 104m from the Internet 103.

Figure 2:
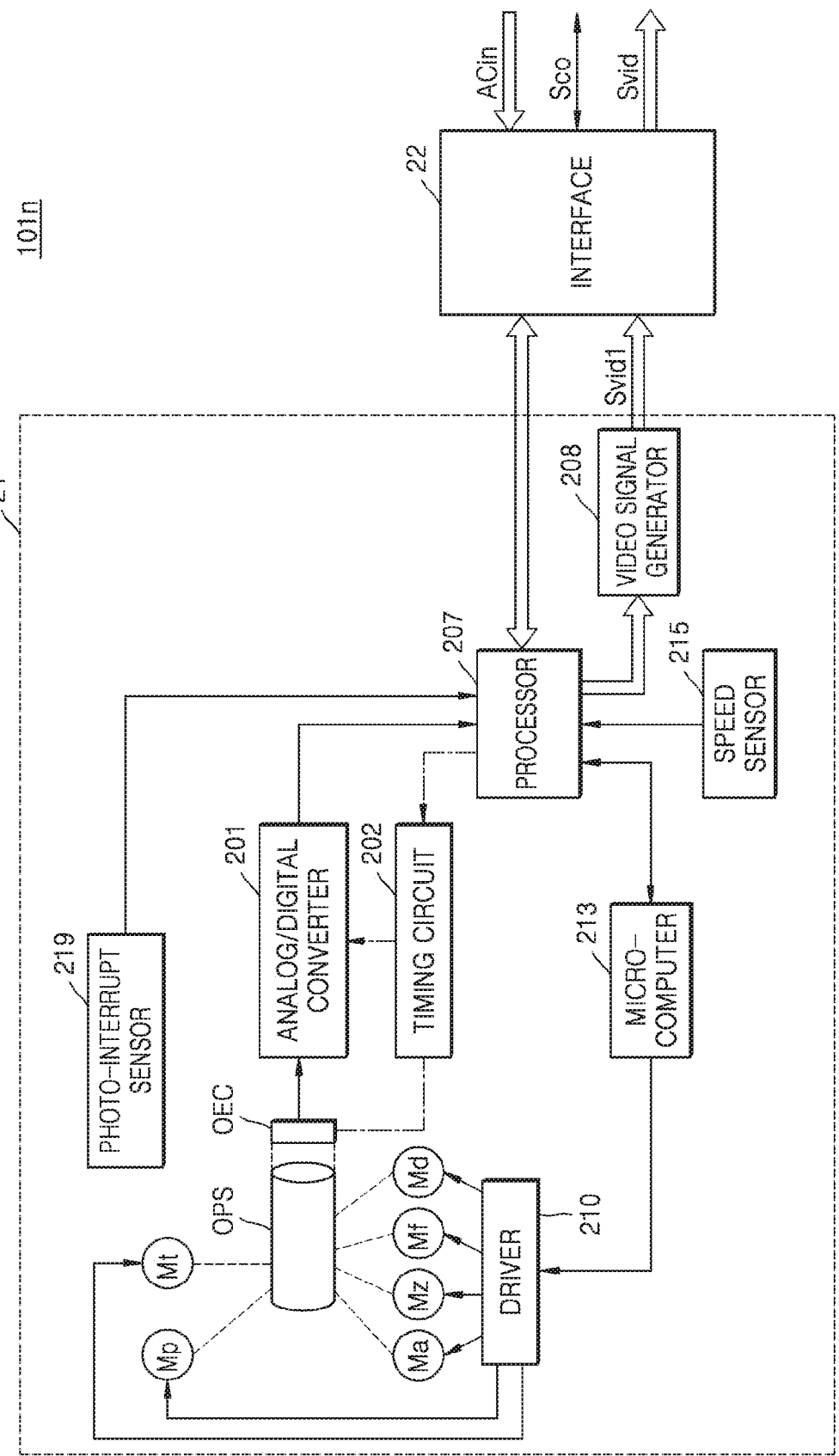
FIG. 2 is a block diagram showing an internal configuration of one of the surveillance cameras in FIG. 1.

FIG. 2 shows an internal configuration of one surveillance camera 101n of FIG. 1.

Referring to FIG. 2, the surveillance camera 101n of the illustrated embodiment includes a main body 21 and an interface 22. In FIG. 2, reference letter ACin denotes an alternating current (AC) power, Sco denotes a communication signal with the digital video recorder (102 of FIG. 1), and Svid1 and Svid denote video signals.

The main body 21 includes an optical system OPS, a photoelectric converter OEC, an analog-to-digital converter 201, a processor 207, a video signal generator 208, a driver 210, a microcomputer 213, an aperture motor Ma, a zoom motor Mz, a focus motor Mf, a filter motor Md, a panning motor Mp, a tilting motor Mt, a speed sensor 215, and a photo-interrupt sensor 219.

The optical system OPS including lenses and an IR cut-off filter optically processes light from an object. The lenses of the optical system OPS include a zoom lens and a focus lens.

The photoelectric converter OEC including a charge coupled device (CCD) or a complementary metal oxide semiconductor (CMOS) converts light from the optical system OPS into an electrical analog signal. Here, the processor 207 controls a timing circuit 202 to control operations of the photoelectric converter OEC and the analog-to-digital converter 201.

The analog-to-digital converter 201 converts an analog image signal from the photoelectric converter OEC into a digital image signal. In detail, the analog-to-digital converter 201 removes radio frequency noise of the analog image signal and adjusts an amplitude of the analog image signal from the photoelectric converter OEC, and then, converts the analog image signal into the digital image signal. The digital image signal is input to the processor 207.

The processor 207, e.g., a digital signal processor, converts a format of the digital image signal from the analog-to-digital converter 201 while controlling operations of the optical system OPS, the photoelectric converter OEC, and the analog-to-digital converter 201. In more detail, the processor 207 generates a digital image signal classified as luminance and chrominance signals by processing the digital signal from the analog-to-digital converter 201.

The video signal generator 208 converts the digital image signal from the processor 207 into a video signal Svid1 that is an analog image signal.

The processor 207 transmits the video signal Svid1 from the video signal generator 208 to the digital video recorder 102, while communicating with the digital video recorder 102 via the interface 22.

In addition, the microcomputer 213 drives the aperture motor Ma, the zoom motor Mz, the focus motor Mf, the filter motor Md, the panning motor Mp, and the tilting motor Mt by controlling the driver 210.

The aperture motor Ma drives an aperture stop, the zoom motor Mz drives the zoom lens, and the focus motor Mf drives the focus lens. The filter motor Md drives the IR cut-off filter.

The panning motor Mp makes an assembly of the optical system OPS and the photoelectric converter OEC rotate to left and right. The tilting motor Mt makes the assembly of the optical system OPS and the photoelectric converter OEC rotate up and down.

The speed sensor 215 includes a gyro sensor and an acceleration sensor, each of which may be constructed according to principles known in the art. The gyro sensor is used to detect and correct shaking of the camera during imaging. The acceleration sensor is used to maintain a tilt-angle while monitoring the tilt-angle after finishing the tilting operation.

The photo-interrupt sensor 219 is used to monitor whether the tilting is normally performed to a command tilt-angle. Also, an additional photo-interrupt sensor may be added to monitor whether the panning to a command panning-angle is performed normally. The illustrated embodiment is only associated with the tilting operation.

Figure 3:
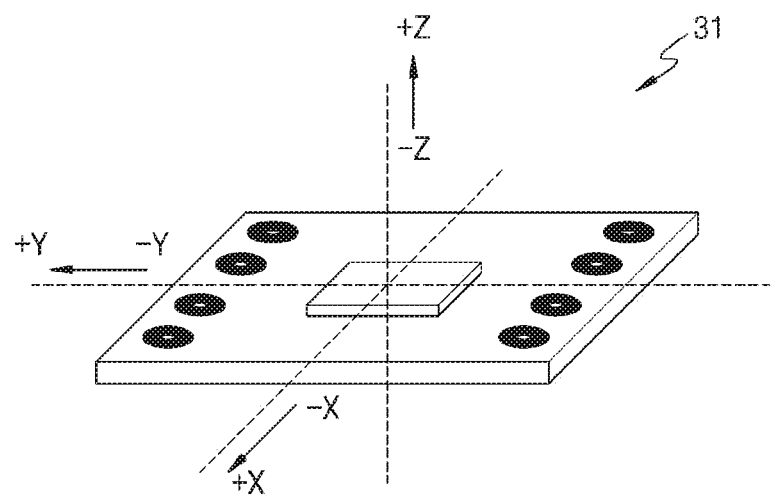
FIG. 3 is a perspective view showing an installation state of an acceleration sensor included in a speed sensor of FIG. 2.

FIG. 3 is a diagram showing an installation state of an acceleration sensor 31 included in the speed sensor 215 of FIG. 2.

Referring to FIG. 3, the acceleration sensor 31 generates acceleration values in X-axis, Y-axis, and Z-axis. When the command tilt-angle is 0°, the acceleration in the Z-axis is equal to the acceleration of gravity, and the acceleration sensor 31 is installed to rotate about the X-axis or the Y-axis as a rotational axis due to the tilting of the surveillance camera (101n of FIG. 1). In the illustrated embodiment, the acceleration sensor 31 is installed to rotate about the X-axis as a rotational axis due to the tilting.

In the acceleration sensor 31 of the illustrated embodiment, the acceleration values in the axes are regularized values. For example, when the acceleration in the Z-axis is equal to the acceleration of gravity, the acceleration in the Z-axis is 1. Here, when the command tilt-angle is 0°, an estimated tilt-angle may be obtained even when the acceleration of the Z-axis is not exactly the same as 1.

Figure 4:
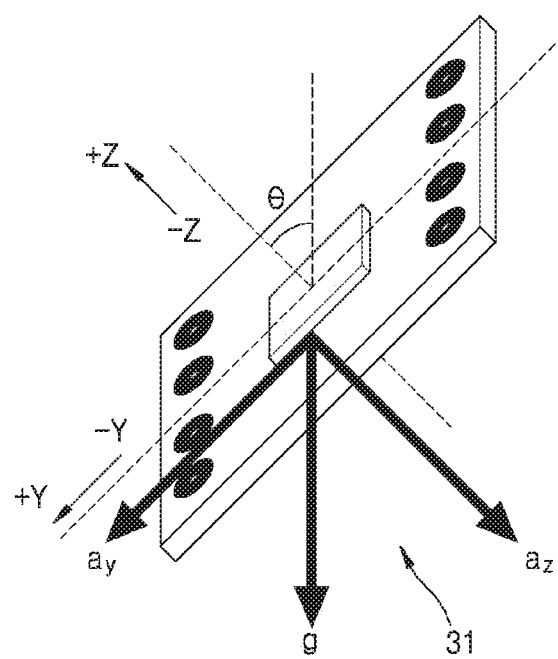
FIG. 4 is a perspective view showing a rotated state of the acceleration sensor of FIG. 3 according to tilting of the surveillance camera to a command tilt-angle.

FIG. 4 shows a rotated state of the acceleration sensor 31 of FIG. 3 due to tilting of the surveillance camera to a command tilt-angle. Here, the acceleration sensor 31 is in a rotated state by an angle θ° about the X-axis as the rotational axis due to the tilting.

Referring to FIG. 4, in a case where the acceleration in the Y-axis is $a_y$ and the acceleration in the Z-axis is $a_z$, Equation 1 below is defined.

$$\tan \theta = a_y/a_z \quad (1)$$

Therefore, the estimated tilt-angle θ may be obtained by Equation 2 below.

$$\theta = \tan^{-1}(a_y/a_z) \quad (2)$$

Here, the acceleration sensor 31 may not output a stabilized value due to a fine variation in gravity (see FIGS. 6 and 7 and Table 1 below). Accordingly, it is necessary to apply an average value of the estimated tilt-angles θ in a unit period. Regarding to this, it will be described as 'acceleration values' in one axis, not 'acceleration value' in one axis.

In addition, the estimated tilt-angle θ may be calculated by using the acceleration values in one axis.

Referring to FIG. 4, Equation 3 below is defined.

$$\sin \theta = a_y/g \quad (3)$$

In Equation 3 above, g is a regularization value corresponding to acceleration of gravity, that is, an acceleration value in the Z-axis when the command tilt-angle is 0°, for example, 1.

Therefore, the estimated tilt-angle θ may be calculated according to Equation 4 below.

$$\theta = \sin^{-1}(a_y/g) \quad (4)$$

Likewise, the estimated tilt-angle θ may be calculated by using the acceleration values in the Z-axis. Referring to FIG. 4, Equation 5 below is defined.

$$\cos \theta = a_z/g \quad (5)$$

Therefore, the estimated tilt-angle θ may be calculated according to Equation 6 below.

$$\theta = \cos^{-1}(a_z/g) \quad (6)$$

Figure 5:
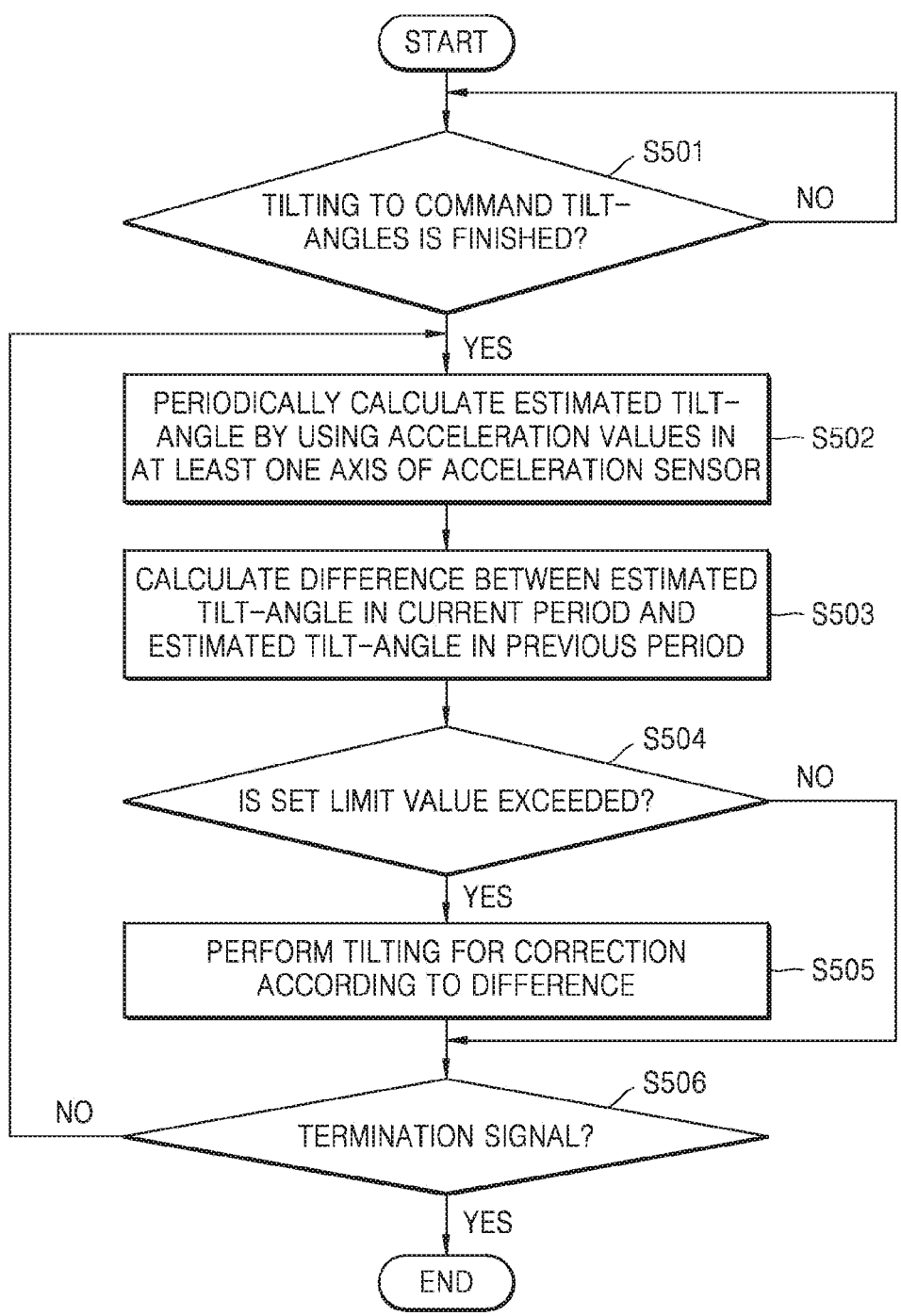
FIG. 5 is a flowchart illustrating a method of maintaining a tilt-angle, performed by a processor of FIG. 2, according to an exemplary embodiment of the invention.

FIG. 5 illustrates a method of maintaining a tilt-angle, performed by the processor 207 of FIG. 2, according to an exemplary embodiment of the disclosure. This will be described with reference to FIGS. 4 and 5.

When a tilting operation to the command tilt-angle is finished in operation S501, the processor 207 periodically calculates the estimated tilt-angle θ by using the acceleration values in at least one axis of the acceleration sensor 31 in operation S502. When a tilting operation to the command tilt-angle is not finished in operation S501, operation S501 will be performed again.

Next, the processor 207 calculates the difference in value between the estimated tilt-angle of the current period and the estimated tilt-angle of the previous period in operation S503.

When the difference value between the estimated tilt-angles exceeds a set limit in operation S504, the processor 207 performs a tilting operation for correction according to the difference value in operation S505. When the difference value between the estimated tilt-angles does not exceed a set limit in operation S504, operation S505 will be skipped, and operation S506 will be performed instead.

The above operations S502 to S505 are repeatedly performed until an end signal is generated in operation S506.

According to the principles of the invention and this exemplary method of maintaining the tilt-angle, the tilt-angle after finishing the tilting operation may be monitored and maintained by using the acceleration values of the acceleration sensor 31 in at least one axis.

Accordingly, in the surveillance camera 101n performing the tilting operation by using the open loop control method according the principles of the invention, a variation in the tilt-angle due to gravity, vibration, wind, heat, etc. as time passes after finishing the tilting operation may be instantly (in real time) detected and corrected.

In addition, most of surveillance cameras include a gyro sensor for detecting and correcting shaking of the camera during imaging. In most cases, the gyro sensor itself is not sold separately, but is sold with the acceleration sensor 31 as the speed sensor 215 of FIG. 2. Therefore, since the method of maintaining the tilt-angle or the method of controlling the tilting according to the illustrated embodiment uses the acceleration sensor 31 included in the speed sensor 215 with the gyro sensor, no additional equipment is required and it is economically efficient.

As described above, the processor 207 monitors whether the surveillance camera (101n of FIG. 2) is shaken according to the values from the gyro sensor included in the speed sensor 215. In the illustrated embodiment, the processor 207 performs the above operations S503 to S505 during a period in which the surveillance camera 101n is determined not to be shaken. It is because operations S503 to S505 are unnecessary while the surveillance camera 101n is being shaken.

For operation S502, with respect to the acceleration values of the acceleration sensor 31 in each axis, Y-axis acceleration values before noise filtering and Y-axis acceleration values after noise filtering are compared with each other in a unit period. In the illustrated embodiment, the noise filtering is performed by using Kalman filter algorithm that is well known in the art.

Figure 6:
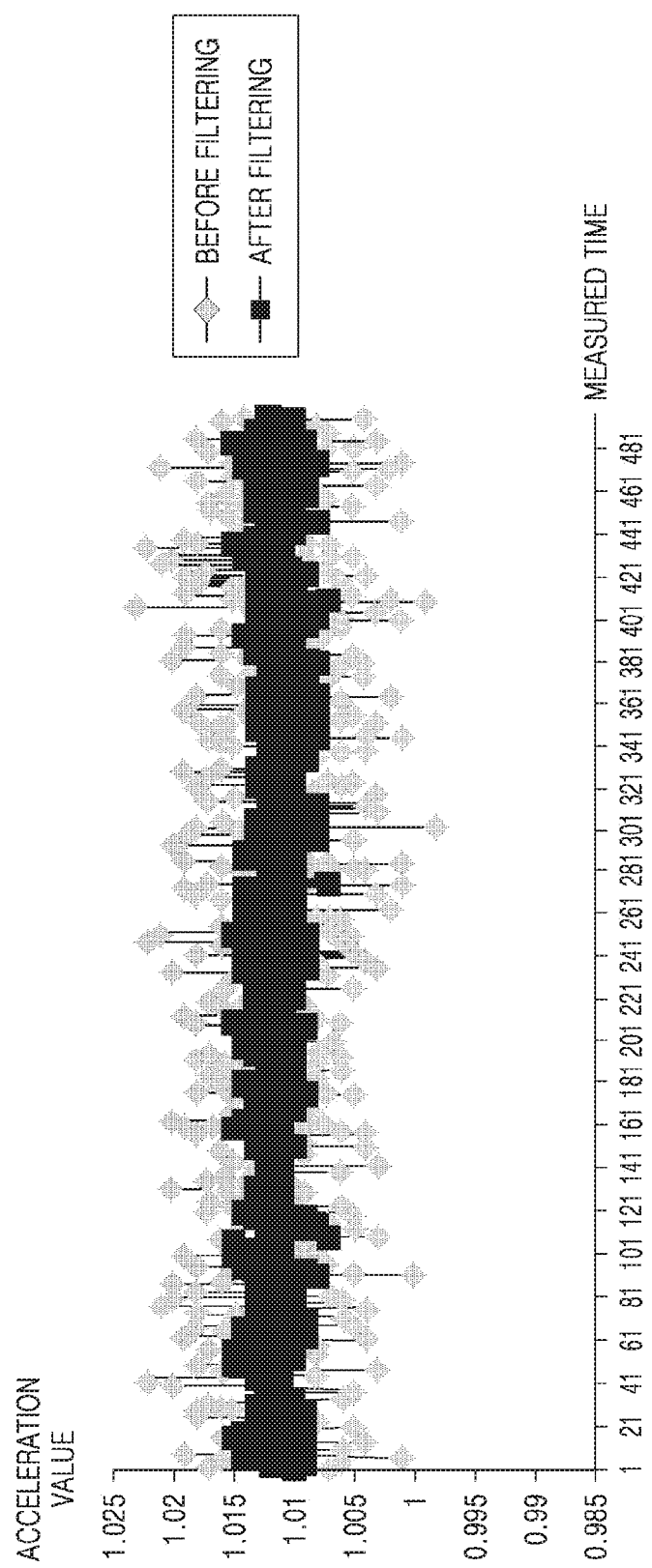
FIG. 6 is a graph comparing Y-axis acceleration values before noise filtering with Y-axis acceleration values after the noise filtering, when a command tilt-angle is 90°.

FIG. 6 is a graph comparing Y-axis acceleration values before noise filtering with Y-axis acceleration values after noise filtering, when a command tilt-angle is 90°.

Figure 7:
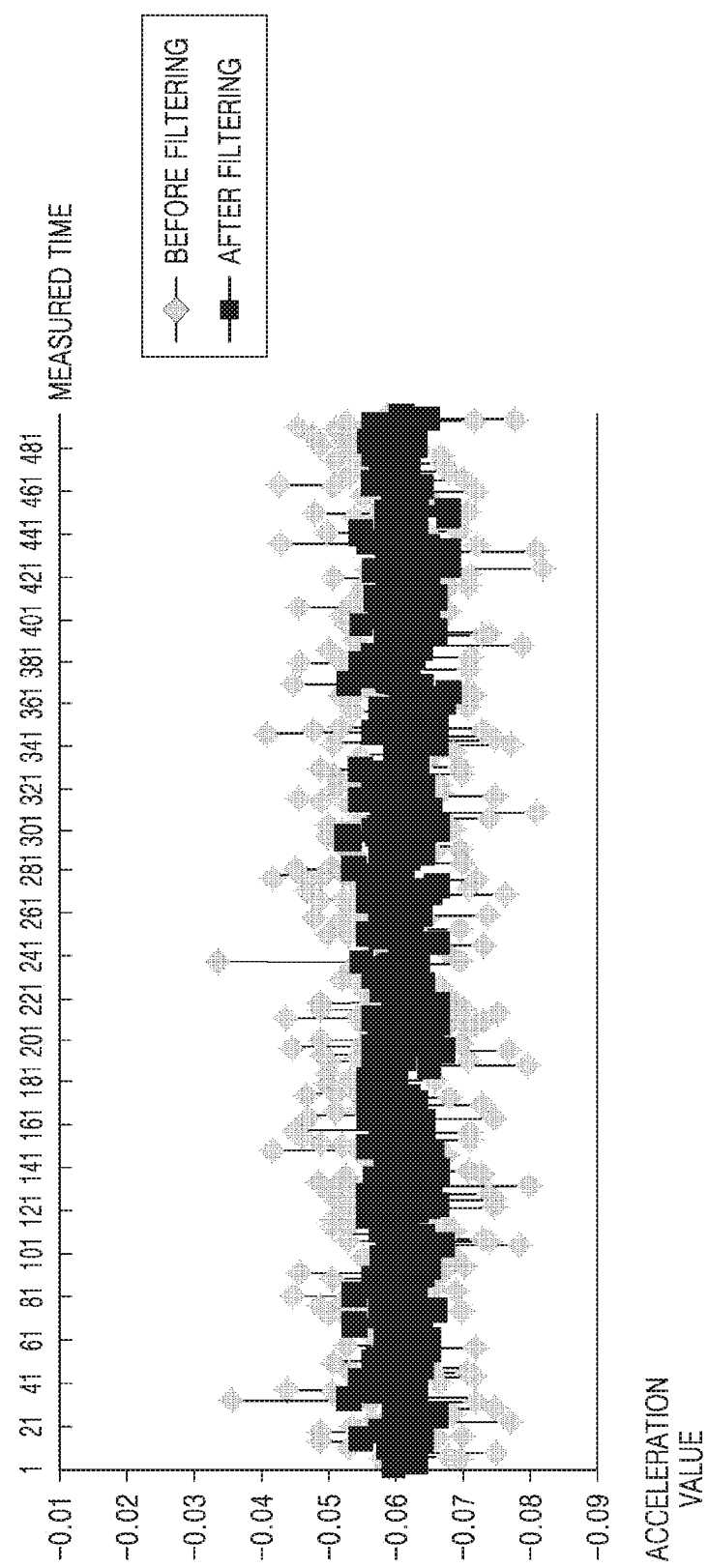
FIG. 7 is a graph comparing Z-axis acceleration values before noise filtering with Z-axis acceleration values after the noise filtering, when a command tilt-angle is 90°.

FIG. 7 is a graph comparing Z-axis acceleration values before noise filtering with Z-axis acceleration values after noise filtering, when a command tilt-angle is 90°.

As shown in FIGS. 6 and 7, the acceleration sensor (31 of FIG. 3) may not output stabilized value due to a fine variation in the gravity (see Table 1 below). Accordingly, it is necessary to apply an average value of the estimated tilt-angles θ in a unit period.

Referring to FIGS. 6 and 7, the acceleration values after the noise filtering have less variation than that of the acceleration values before the noise filtering, and are more stabilized. Therefore, the noise filtering may be performed with respect to the acceleration values of each axis from the acceleration sensor 31.

Table 1 below shows the estimated tilt-angles θ° by substituting Equation 2 above with the acceleration values as a result of noise filtering, after finishing tilting to the command tilt-angle, e.g., 45°, about the X-axis as the rotational axis. As a reference, included in data of the Table, minus sign is related to an output polarity of the acceleration sensor 31.

TABLE 1

| Read Number | Y-axis acceleration values from acceleration sensor | X-axis acceleration values from acceleration sensor | Z-axis acceleration values from acceleration sensor | Y-axis acceleration values as noise filtering result | X-axis acceleration values as noise filtering result | Z-axis acceleration values as noise filtering result | Estimated tilt-angle ($\theta°$) |
|---|---|---|---|---|---|---|---|
| 1 | 0.724 | −0.018 | −0.749 | 0.726 | −0.007 | −0.758 | −43.69 |
| 2 | 0.732 | 0.002 | −0.756 | 0.728 | −0.005 | −0.759 | −43.96 |
| 3 | 0.730 | 0.009 | −0.763 | 0.726 | −0.001 | −0.765 | −43.66 |
| 4 | 0.729 | −0.012 | −0.758 | 0.727 | −0.004 | −0.766 | −43.58 |
| 5 | 0.722 | 0.006 | −0.775 | 0.726 | −0.004 | −0.767 | −43.27 |
| 6 | 0.717 | −0.023 | −0.780 | 0.725 | −0.005 | −0.766 | −43.11 |
| 7 | 0.731 | 0.004 | −0.757 | 0.727 | −0.002 | −0.755 | −44.07 |
| 8 | 0.726 | −0.012 | −0.760 | 0.727 | −0.007 | −0.754 | −43.92 |
| 9 | 0.723 | −0.013 | −0.742 | 0.727 | −0.006 | −0.758 | −43.65 |
| 10 | 0.732 | 0.011 | −0.747 | 0.728 | −0.003 | −0.755 | −44.11 |
| 11 | 0.723 | −0.018 | −0.745 | 0.724 | −0.010 | −0.755 | −43.76 |
| 12 | 0.731 | 0.014 | −0.729 | 0.726 | −0.004 | −0.756 | −44.04 |
| 13 | 0.727 | −0.005 | −0.761 | 0.727 | −0.003 | −0.761 | −43.69 |
| 14 | 0.723 | −0.007 | −0.763 | 0.728 | −0.002 | −0.759 | −43.61 |
| 15 | 0.732 | 0.002 | −0.764 | 0.728 | −0.004 | −0.757 | −44.04 |
| ... | ... | ... | ... | ... | ... | ... | ... |
| 485 | 0.718 | −0.022 | −0.770 | 0.725 | −0.006 | −0.760 | −43.37 |
| 486 | 0.726 | −0.009 | −0.755 | 0.727 | −0.002 | −0.754 | −43.92 |
| 487 | 0.728 | 0.005 | −0.725 | 0.726 | 0.000 | −0.752 | −44.07 |
| 488 | 0.723 | −0.017 | −0.737 | 0.727 | −0.005 | −0.755 | −43.76 |
| 489 | 0.728 | 0.014 | −0.747 | 0.725 | −0.003 | −0.757 | −43.88 |
| 490 | 0.720 | −0.016 | −0.759 | 0.726 | −0.005 | −0.761 | −43.41 |
| 491 | 0.732 | 0.004 | −0.755 | 0.728 | −0.001 | −0.756 | −44.08 |
| 492 | 0.729 | 0.000 | −0.759 | 0.730 | −0.004 | −0.753 | −44.07 |
| 493 | 0.723 | −0.019 | −0.742 | 0.727 | −0.005 | −0.751 | −43.91 |
| 494 | 0.736 | 0.012 | −0.755 | 0.731 | −0.001 | −0.755 | −44.27 |
| 495 | 0.727 | −0.012 | −0.754 | 0.730 | −0.005 | −0.755 | −43.92 |
| 496 | 0.730 | −0.001 | −0.770 | 0.728 | −0.004 | −0.770 | −43.47 |
| 497 | 0.726 | 0.000 | −0.738 | 0.729 | −0.001 | −0.753 | −43.95 |
| 498 | 0.719 | −0.014 | −0.730 | 0.726 | −0.004 | −0.757 | −43.53 |
| 499 | 0.727 | 0.003 | −0.750 | 0.726 | −0.006 | −0.751 | −44.07 |
| 500 | 0.715 | −0.017 | −0.748 | 0.724 | −0.007 | −0.761 | −43.21 |
| Average | 0.72679 | −0.00423 | −0.76255 | 0.72677 | −0.00385 | −0.76134 | −43.67034 |

Referring to Table 1 above, a command tilt-angle is 45° and an estimated tilt-angle $\theta$ using the acceleration sensor is about 43.67°. Therefore, when an offset correction of 1.33° is performed with respect to the estimated tilt-angle, the estimated tilt-angle and the command tilt-angle may be nearly the same as each other.

Through the offset correction as described above, a user may conveniently manage data. However, without the above offset correction, the method of maintaining the tilt-angle may be executed (an effect of the disclosure). The method of maintaining the tilt-angle monitors whether the tilt-angle is changed based on a difference between the estimated tilt-angle of the current period and the estimated tilt-angle of the previous period.

Table 2 below shows calculation of the estimated tilt-angle by substituting Equation 2 above with the acceleration values as the result of noise filtering and execution of offset correction of 1.33° as described above, after finishing the tilting to the command tilt-angle of 30° about the X-axis as a rotational axis.

TABLE 2

| Read number | Y-axis acceleration values from acceleration sensor | Z-axis acceleration values from acceleration sensor | Y-axis acceleration values as noise filtering result | Z-axis acceleration values as noise filtering result | Before offset correction estimated tilt-angle ($\theta°$) | After offset correction estimated tilt-angle ($\theta'°$) |
|---|---|---|---|---|---|---|
| 1 | 0.526 | −0.927 | 0.519 | −0.923 | 29.68 | 31.01 |
| 2 | 0.515 | −0.942 | 0.516 | −0.929 | 29 | 30.33 |
| 3 | 0.513 | −0.927 | 0.516 | −0.929 | 28.91 | 30.24 |
| 4 | 0.508 | −0.923 | 0.514 | −0.925 | 28.78 | 30.11 |
| 5 | 0.520 | −0.908 | 0.517 | −0.925 | 29.34 | 30.67 |
| 6 | 0.512 | −0.911 | 0.517 | −0.928 | 28.89 | 30.22 |
| 7 | 0.519 | −0.922 | 0.518 | −0.926 | 29.27 | 30.6 |
| 8 | 0.516 | −0.909 | 0.515 | −0.926 | 29.13 | 30.46 |
| 9 | 0.510 | −0.906 | 0.513 | −0.933 | 28.66 | 29.99 |
| 10 | 0.517 | −0.925 | 0.514 | −0.937 | 28.89 | 30.22 |
| 11 | 0.523 | −0.935 | 0.517 | −0.934 | 29.25 | 30.58 |
| 12 | 0.514 | −0.913 | 0.517 | −0.926 | 29.03 | 30.36 |
| 13 | 0.518 | −0.941 | 0.518 | −0.928 | 29.17 | 30.5 |

TABLE 2-continued

| Read number | Y-axis acceleration values from acceleration sensor | Z-axis acceleration values from acceleration sensor | Y-axis acceleration values as noise filtering result | Z-axis acceleration values as noise filtering result | Before offset correction estimated tilt-angle (θ°) | After offset correction estimated tilt-angle (θ'°) |
|---|---|---|---|---|---|---|
| 14 | 0.523 | −0.934 | 0.518 | −0.926 | 29.46 | 30.79 |
| 15 | 0.509 | −0.915 | 0.515 | −0.926 | 28.8 | 30.13 |
| ... | ... | ... | ... | ... | ... | ... |
| 485 | 0.517 | −0.930 | 0.518 | −0.927 | 29.15 | 30.48 |
| 486 | 0.514 | −0.906 | 0.517 | −0.922 | 29.14 | 30.47 |
| 487 | 0.512 | −0.939 | 0.515 | −0.923 | 29.02 | 30.35 |
| 488 | 0.514 | −0.941 | 0.516 | −0.930 | 28.93 | 30.26 |
| 489 | 0.511 | −0.940 | 0.516 | −0.926 | 28.89 | 30.22 |
| 490 | 0.517 | −0.912 | 0.518 | −0.920 | 29.33 | 30.66 |
| 491 | 0.518 | −0.940 | 0.519 | −0.928 | 29.17 | 30.5 |
| 492 | 0.510 | −0.916 | 0.515 | −0.924 | 28.9 | 30.23 |
| 493 | 0.516 | −0.930 | 0.516 | −0.926 | 29.13 | 30.46 |
| 494 | 0.521 | −0.935 | 0.517 | −0.931 | 29.23 | 30.56 |
| 495 | 0.510 | −0.932 | 0.516 | −0.927 | 28.82 | 30.15 |
| 496 | 0.521 | −0.935 | 0.515 | −0.928 | 29.31 | 30.64 |
| 497 | 0.515 | −0.928 | 0.515 | −0.928 | 29.03 | 30.36 |
| 498 | 0.511 | −0.930 | 0.514 | −0.928 | 28.84 | 30.17 |
| 499 | 0.525 | −0.915 | 0.518 | −0.927 | 29.52 | 30.85 |
| 500 | 0.515 | −0.937 | 0.515 | −0.932 | 28.92 | 30.25 |
| Average | 0.51635 | −0.9255 | 0.51624 | −0.92725 | 29.11156 | 30.44156 |

Referring to Table 2 above, when an offset correction of 1.33° is performed with respect to the estimated tilt-angle, it may be identified that the estimated tilt-angle and the command tilt-angle are close to each other.

Figure 8:
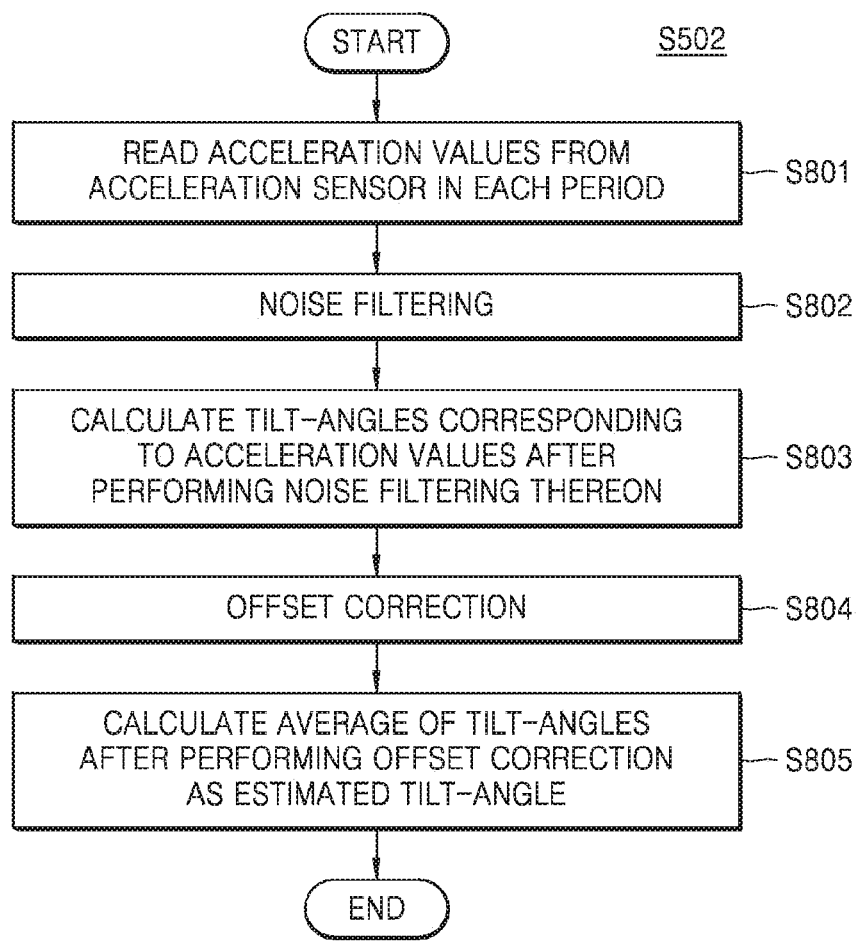
FIG. 8 is a detailed flowchart of an operation S502 of FIG. 5.

FIG. 8 is a detailed flowchart of operation S502 of FIG. 5. This will be described below with reference to FIGS. 4 and 8.

The processor 207 of FIG. 2 reads acceleration values in at least one axis from the acceleration sensor 31 in each period in operation S801 (see Table 1 above).

Next, the processor 207 performs noise filtering with respect to the acceleration values from the acceleration sensor 31 in operation S802 (see Table 1 above).

Next, the processor 207 calculates tilt-angles corresponding to the acceleration values that are results of the noise filtering in operation S803 (see Table 1 above).

Next, the processor 207 performs the offset correction on the calculated tilt-angles in operation S804 see Table 2 above). An offset value for performing operation S804 is calculated before starting a tilting operation to the command tilt-angle.

In addition, the processor 207 calculates an average angle of the tilt-angles that are results of the offset correction as the estimated tilt-angle in operation S805 see Table 2 above).

As described above, the user may conveniently manage data through the offset correction in operation S804. However, without the above offset correction, the method of maintaining the tilt-angle may be executed. The method of maintaining the tilt-angle monitors whether the tilt-angle is changed based on the difference between the estimated tilt-angle of the current period and the estimated tilt-angle of the previous period. Therefore, if the data management of the user is not important, operation S804 may be omitted.

Figure 9:
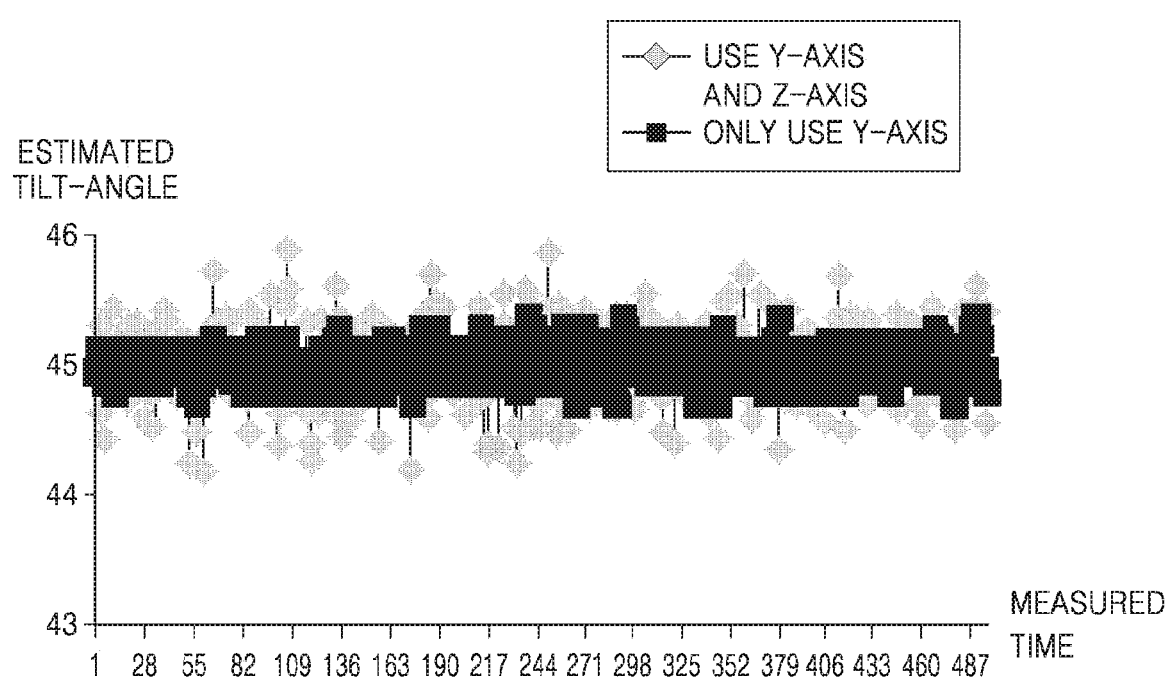
FIG. 9 is a graph comparing estimated tilt-angles calculated by using Y-axis and Z-axis acceleration values with estimated tilt-angles calculated by only using Y-axis acceleration values, when a command tilt-angle is 45°.

FIG. 9 is a graph comparing estimated tilt-angles calculated by applying Y-axis and Z-axis acceleration values with estimated tilt-angles calculated by only applying Y-axis acceleration values, when a command tilt-angle is 45°.

Referring to FIG. 9, the estimated tilt-angles calculated only by applying the Y-axis (using Equation 4 above) have less deviation and are more stabilized than the estimated tilt-angles calculated by applying the acceleration values in the Y-axis and the Z-axis (using Equation 2 above). That is, it is the estimated tilt-angles may be calculated only by applying the single axis (using Equation 4 or 6 above).

Experimental data supporting FIG. 9 is shown in Table 3 below.

TABLE 3

| Read Number | Y-axis acceleration values as noise filtering result | Z-axis acceleration values as noise filtering result | Estimated tilt-angles as result of applying Y-axis and Z-axis acceleration values (before offset correction) | Estimated tilt-angles as result of only applying Y-axis acceleration values (before offset correction) | Estimated tilt-angles as result of applying Y-axis and Z-axis acceleration values (after 1.33° offset correction) | Estimated tilt-angles as result of only applying Y-axis acceleration values (after 1.62° offset correction) |
|---|---|---|---|---|---|---|
| 1 | 0.726 | −0.758 | 43.69 | 46.55 | 45.02 | 44.93 |
| 2 | 0.728 | −0.759 | 43.96 | 46.72 | 45.29 | 45.1 |
| 3 | 0.726 | −0.765 | 43.66 | 46.55 | 44.99 | 44.93 |
| 4 | 0.727 | −0.766 | 43.58 | 46.64 | 44.91 | 45.02 |
| 5 | 0.726 | −0.767 | 43.27 | 46.55 | 44.6 | 44.93 |
| 6 | 0.725 | −0.766 | 43.11 | 46.47 | 44.44 | 44.85 |

TABLE 3-continued

| Read Number | Y-axis acceleration values as noise filtering result | Z-axis acceleration values as noise filtering result | Estimated tilt-angles as result of applying Y-axis and Z-axis acceleration values (before offset correction) | Estimated tilt-angles as result of only applying Y-axis acceleration values (before offset correction) | Estimated tilt-angles as result of applying Y-axis and Z-axis acceleration values (after 1.33° offset correction) | Estimated tilt-angles as result of only applying Y-axis acceleration values (after 1.62° offset correction) |
|---|---|---|---|---|---|---|
| 7 | 0.727 | −0.755 | 44.07 | 46.64 | 45.4 | 45.02 |
| 8 | 0.727 | −0.754 | 43.92 | 46.64 | 45.25 | 45.02 |
| 9 | 0.727 | −0.758 | 43.65 | 46.64 | 44.98 | 45.02 |
| 10 | 0.728 | −0.755 | 44.11 | 46.72 | 45.44 | 45.1 |
| 11 | 0.724 | −0.755 | 43.76 | 46.39 | 45.09 | 44.77 |
| 12 | 0.726 | −0.756 | 44.04 | 46.55 | 45.37 | 44.93 |
| 13 | 0.727 | −0.761 | 43.69 | 46.64 | 45.02 | 45.02 |
| 14 | 0.728 | −0.759 | 43.61 | 46.72 | 44.94 | 45.1 |
| 15 | 0.728 | −0.757 | 44.04 | 46.72 | 45.37 | 45.1 |
| ... | ... | ... | ... | ... | ... | ... |
| 485 | 0.725 | −0.76 | 43.37 | 46.47 | 44.7 | 44.85 |
| 486 | 0.727 | −0.754 | 43.92 | 46.64 | 45.25 | 45.02 |
| 487 | 0.726 | −0.752 | 44.07 | 46.55 | 45.4 | 44.93 |
| 488 | 0.727 | −0.755 | 43.76 | 46.64 | 45.09 | 45.02 |
| 489 | 0.725 | −0.757 | 43.88 | 46.47 | 45.21 | 44.85 |
| 490 | 0.726 | −0.761 | 43.41 | 46.55 | 44.74 | 44.93 |
| 491 | 0.728 | −0.756 | 44.08 | 46.72 | 45.41 | 45.1 |
| 492 | 0.73 | −0.753 | 44.07 | 46.89 | 45.4 | 45.27 |
| 493 | 0.727 | −0.751 | 43.91 | 46.64 | 45.24 | 45.02 |
| 494 | 0.731 | −0.755 | 44.27 | 46.97 | 45.6 | 45.35 |
| 495 | 0.73 | −0.755 | 43.92 | 46.89 | 45.25 | 45.27 |
| 496 | 0.728 | −0.77 | 43.47 | 46.72 | 44.8 | 45.1 |
| 497 | 0.729 | −0.753 | 43.95 | 46.8 | 45.28 | 45.18 |
| 498 | 0.726 | −0.757 | 43.53 | 46.55 | 44.86 | 44.93 |
| 499 | 0.726 | −0.751 | 44.07 | 46.55 | 45.4 | 44.93 |
| 500 | 0.724 | −0.761 | 43.21 | 46.39 | 44.54 | 44.77 |
| average | 0.7268 | −0.761 | 43.67 | 46.62 | 45 | 45 |

When the estimated tilt-angle is calculated only by applying single axis (using Equation 4 or 6 above), a sine curve has a relatively large inclination within ranges of 0° to 45° and 135° to 180° and a cosine curve has a relatively large inclination within a range of 45° to 135°. By using this, the single axis of the acceleration sensor 31 may be alternately applied according to the command tilt-angle.

For example, when a tilting range is 0° to 180° and the command tilt-angle is in a first range, that is, 0° to 45° and 135° to 180°, the estimated tilt-angle is calculated according to the acceleration values in the Y-axis (using Equation 4 above). Also, when the command tilt-angle is included in a second range, that is, 45° to 135°, the estimated tilt-angle is calculated according to the acceleration values in the Z-axis (using Equation 6 above).

Figure 10:
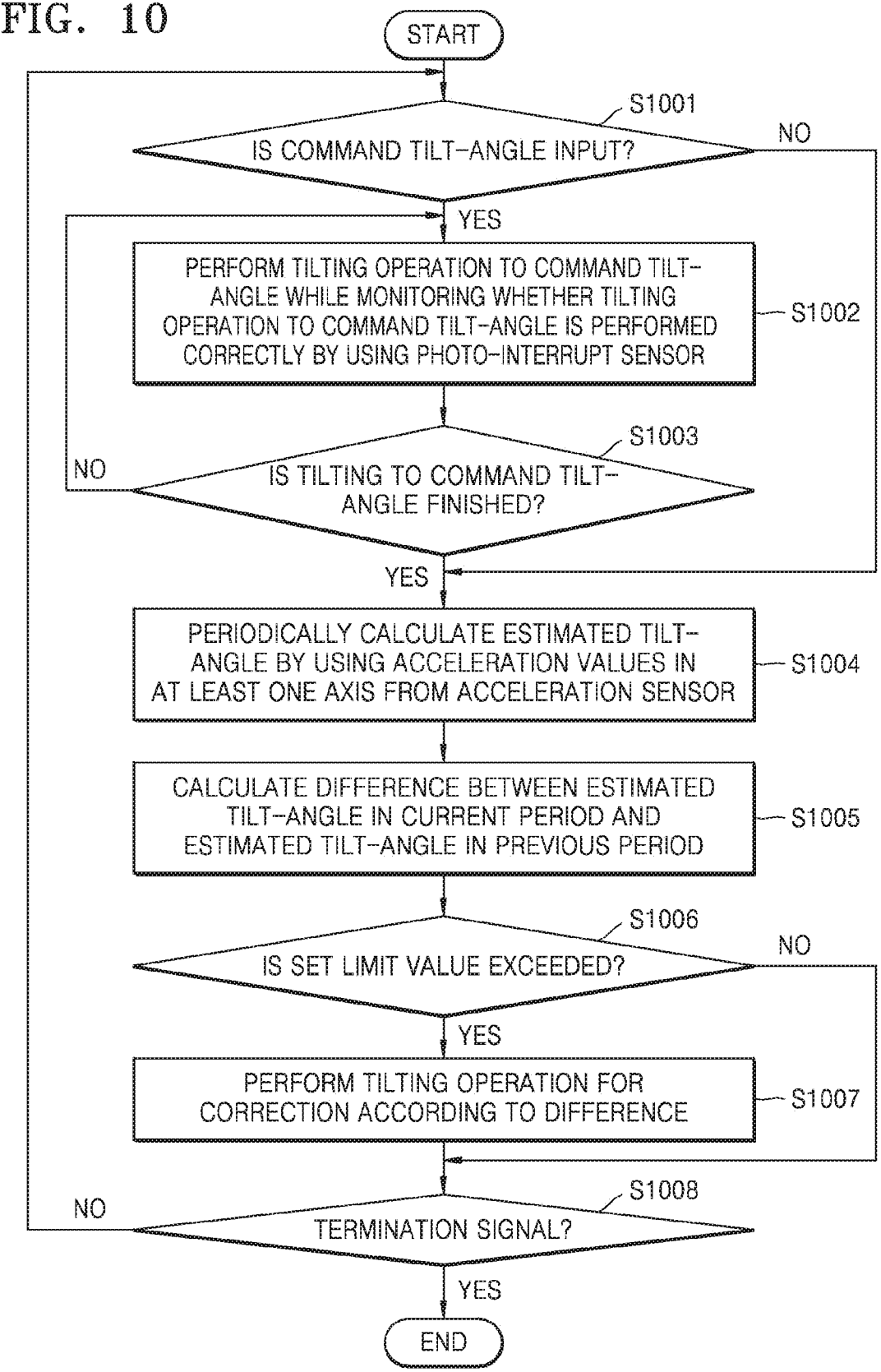
FIG. 10 is a flowchart of a method of controlling tilting, performed by the processor of FIG. 2, according to another exemplary embodiment of the invention.

FIG. 10 is a flowchart of a method of controlling tilting, performed by the processor 207 of FIG. 2, according to an exemplary embodiment. This will be described with reference to FIGS. 2, 4 and 5.

When a command tilt-angle is input in operation S1001, the processor 207 performs a tilting operation to the command tilt-angle and monitors whether the tilting to the command tilt-angle is normally performed by using a photo-interrupt sensor 219 in operation S1002. When a command tilt-angle is not input in operation S1001, operations S1002 and s1003 will be skipped, and operation S1004 will be performed instead. Operation S1002 will be described in more detail with reference to FIGS. 11 to 15.

When the tilting operation to the command tilt-angle is finished in operation S1003, the processor 207 periodically calculates the estimated tilt-angle θ by using the acceleration values in at least one axis from the acceleration sensor 31 in operation S1004. When the tilting operation to the command tilt-angle is not finished in operation S1003, operation S1002 will be performed again.

Next, the processor 207 calculates a difference value between the estimated tilt-angle of the current period and the estimated tilt-angle of the previous period in operation S1005.

When the difference in value between the estimated tilt-angles exceeds a set limit in operation S1006, the processor 207 performs a tilting operation for correction according to the difference value in operation S1007. When the difference value between the estimated tilt-angles does not exceed a set limit in operation S1006, operation S1007 will be skipped, and operation S1008 will be performed instead.

The above operations S1001 to S1007 are repeatedly performed until a termination signal is generated in operation S1008.

According to a method of controlling tilting according to the illustrated embodiment, when a surveillance camera performing the tilting operation employs an open loop control method, the tilting operation to the command tilt-angle may be normally performed by using the photo-interrupt sensor 219 that is inexpensive.

Operations S1003 to S1007 are the same as operations S501 to S505 in FIG. 5. Therefore, detailed descriptions about operations S1003 to S1007 will be omitted to avoid redundancy.

Figure 11:
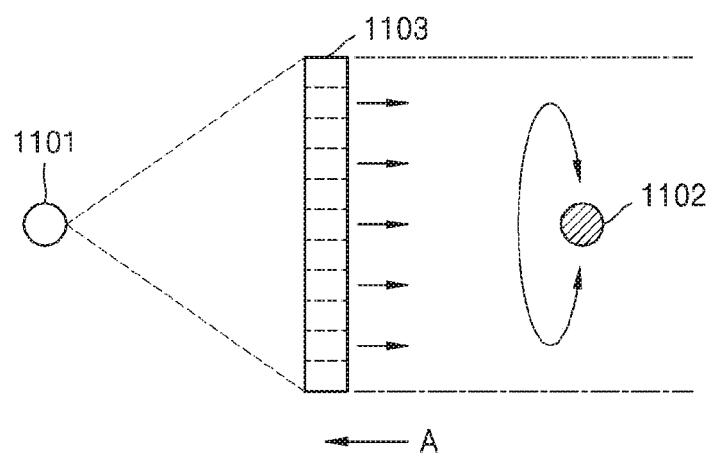
FIG. 11 is a side view of a photo-interrupt sensor of FIG. 2.
Figure 12:
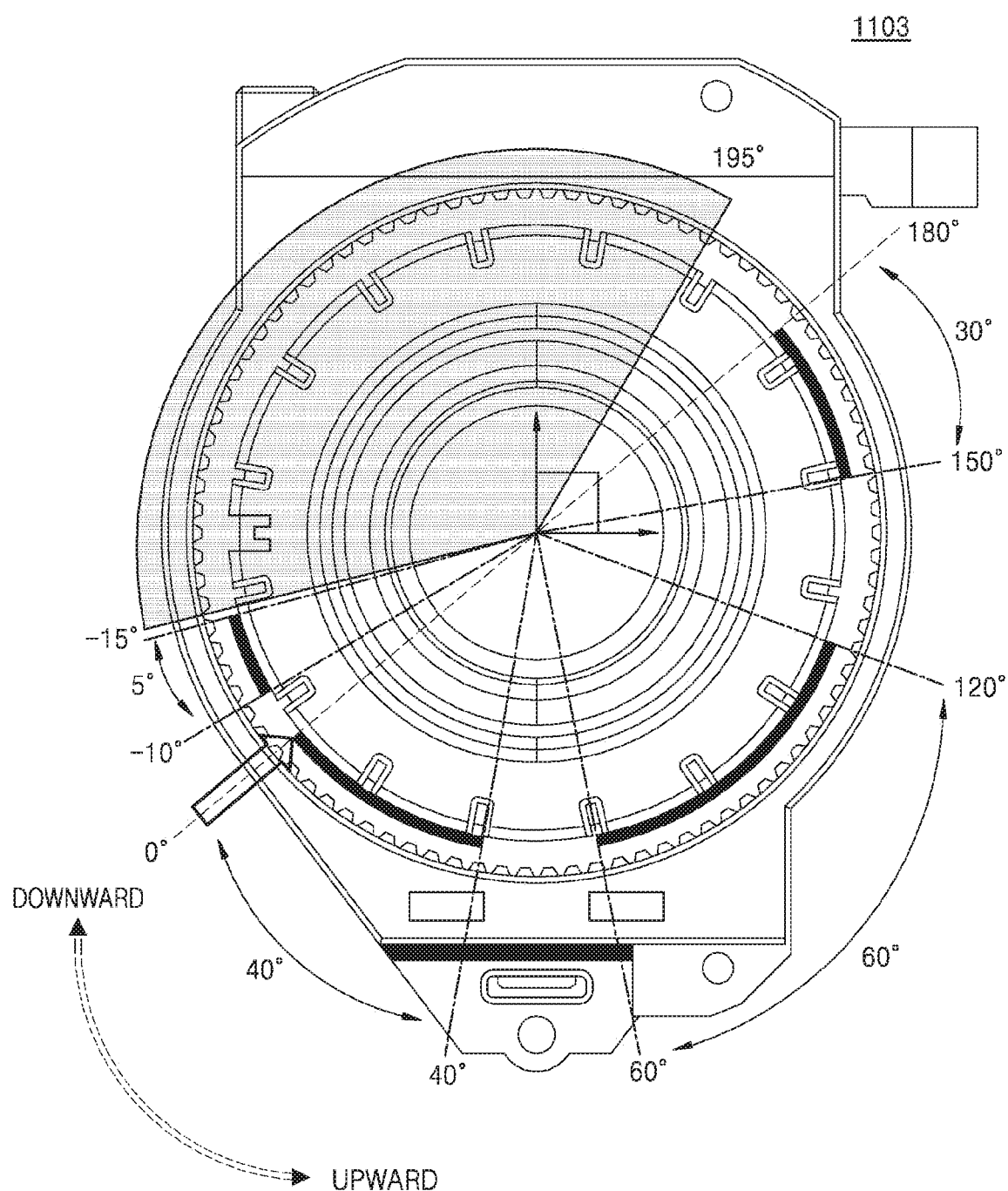
FIG. 12 is a front schematic view of a disc from a direction A of FIG. 11.
Figure 13:
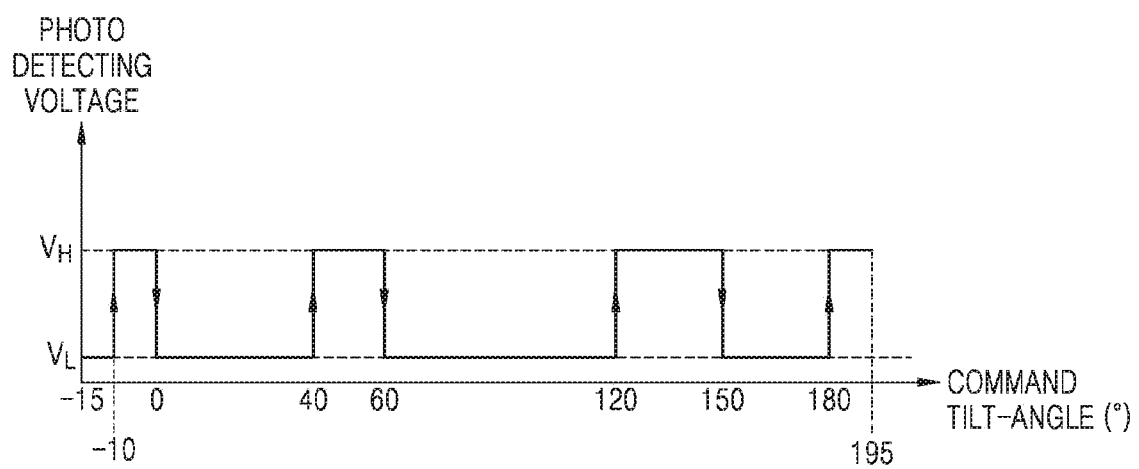
FIG. 13 is a waveform diagram of a logic signal generated by the photo detecting device of FIG. 11 rotated by the titling.

FIG. 11 is a side view of the photo-interrupt sensor of FIG. 2. FIG. 12 is a front schematic view of a disc 1103 when it is seen from a direction A of FIG. 11. FIG. 13 is a waveform diagram of a logic signal generated by the photo detecting device 1102 of FIG. 11 being rotated by the titling.

Referring to FIGS. 11 to 13, the photo-interrupt sensor 219 includes a light-emitting device 1101, a photo detecting device 1102, and a disc 1103.

The light-emitting device 1101 irradiates light in a first direction. The photo detecting device 1102 is installed to rotate around the disc 1103 according to the tilting.

The disc 1103 located between the light-emitting device 1101 and the photo detecting device 1102 in the first direction has transmitting regions that transmit the light from the light-emitting device 1101 and blocking regions that block the light from the light-emitting device 1101.

Referring to the illustrated embodiment shown in FIG. 12, a range of the command tilt-angle is 0° to 180°, but tilt ranges of −15° (345°) to 0° and 180° to 195° are used for tilting initialization. In the disc 1103, the transmitting regions for transmitting the light from the light-emitting device 1101 are provided at locations corresponding to tilt-angles of −10° (350°) to 0°, 40° to 60°, 120° to 150°, and 180° to 195°. That is, the block regions for blocking the light from the light-emitting device 1101 are provided at locations corresponding to tilt-angles of −15° (345°) to −10° (350°), 0° to 40°, 60° to 120°, and 150° to 180°. Here, since lengths of the transmitting regions and the block regions are all different from one another, the tilt-angle range of each of the transmitting regions and the block regions is set differently from the others.

Since the photo detecting device 1102 passes through the transmitting regions and the block regions while tilting, the photo detecting device 1102 outputs logic high signals and logic low signals to the processor 207 (see FIG. 13).

In the disc 1103, reference tilt-angles −10°, 0°, 40°, 60°, 120°, 150°, and 180° are set with respect to an end (corresponding to a rising edge or a falling edge in FIG. 13) of each of the transmitting regions and the block regions.

While the tilting is performed in operation S1002 of FIG. 10, the processor 207 performs a correction control when the difference between the reference tilt-angle according to tilting process and accumulated tilt-angles in the current period is greater than a reference difference at a time point of sensing when the photo detecting device 1102 is at the end of each of the transmitting regions and the block regions.

FIG. 13 is a waveform diagram of a logic signal generated by a photo detecting device of FIG. 11 rotated by the tilting operation.

Figure 14:
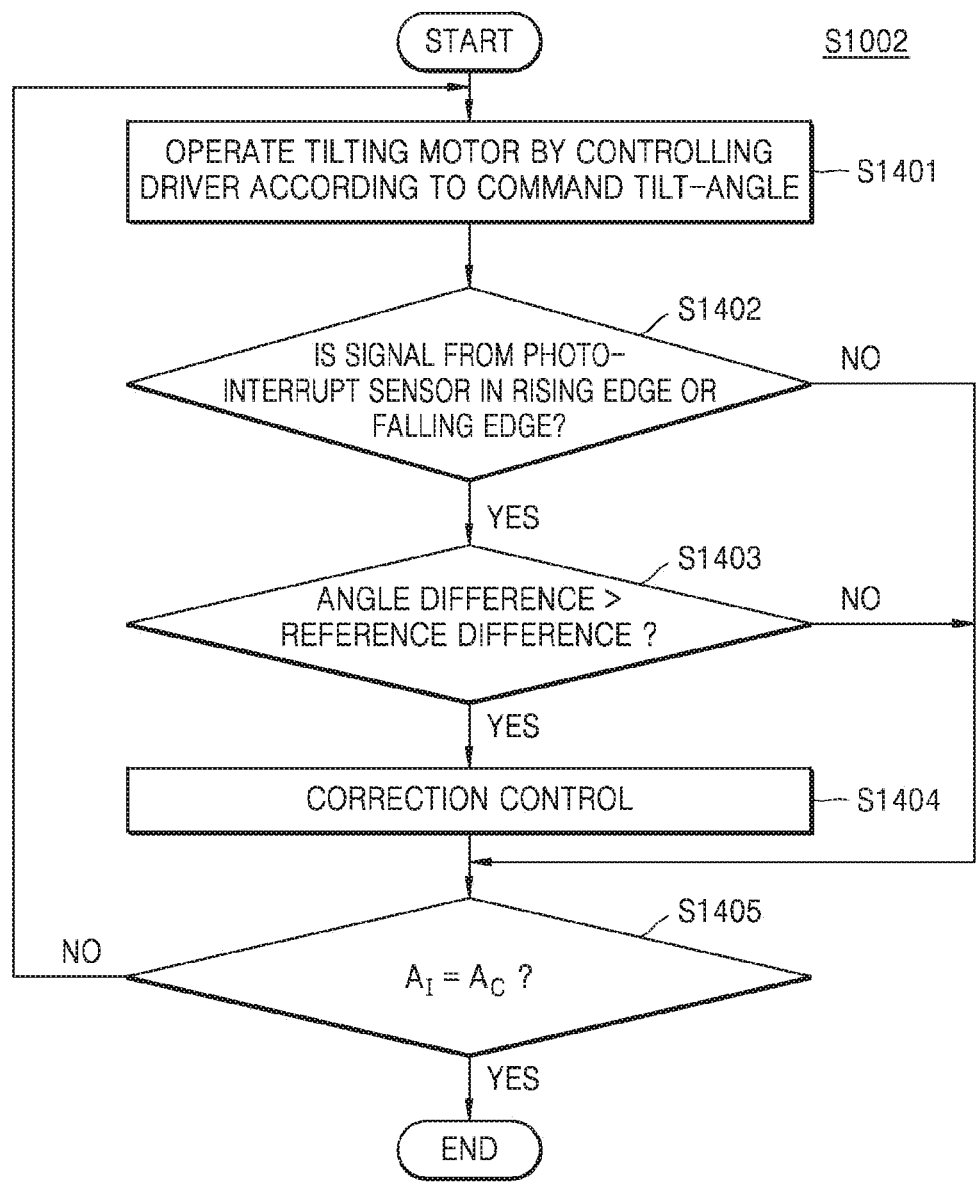
FIG. 14 is a detailed flowchart of an operation S1002 of FIG. 10.

FIG. 14 is a detailed flowchart of operation S1002 of performing the tilting operation in FIG. 10. This will be described with reference to FIGS. 2, 11 to 13, and 14.

The processor 207 operates the tilting motor Mt by controlling the driver 210 according to the command tilt-angle in operation S1401.

In addition, when the signal from the photo-interrupt sensor 219 is in a rising edge or falling edge and the difference between the reference tilt-angle according to the tilting process and the accumulated tilt-angles in the current period is greater than a reference difference, the processor 207 performs the correction control in operations S1402 to S1404.

Above operations S1401 to S1404 are repeatedly performed until the command tilt-angle $A_I$ is equal to the accumulated tilt-angle $A_C$ (S1405).

Figure 15:
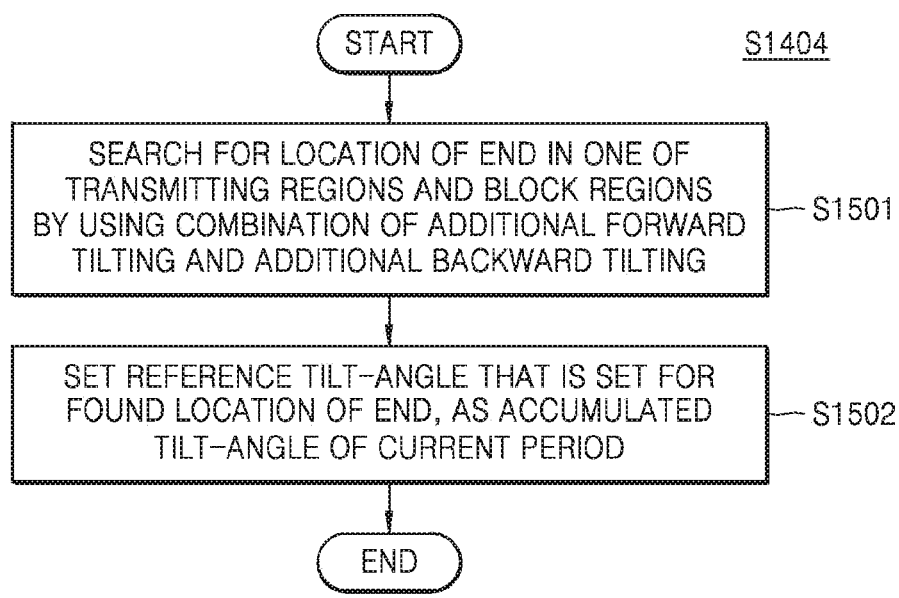
FIG. 15 is a detailed flowchart of an operation S1404 of FIG. 14.

FIG. 15 is a detailed flowchart of operation S1404 of correction control in FIG. 14. This will be described with reference to FIGS. 2, 11 to 13, and 15.

The processor 207 searches for a location of the end (corresponding to the rising edge or falling edge in FIG. 13) in one of the transmitting regions and the block regions by using a combination of an additional forward tilting and an additional backward tilting in operation S1501.

Next, the processor 207 sets the reference tilt-angle according to the found location of the end as the accumulated tilt-angle in the current period in operation S1502.

Accordingly, the processor 207 may detect an out-of-phase phenomenon that may occur during the tilting process, and may instantly deal with the out-of-phase phenomenon.

As described above, according to the method of maintaining the tilt-angle or the method of controlling tilting according to the principles of the invention and the exemplary embodiments, the tilt-angle after finishing the tilting may be monitored and maintained by using acceleration values in at least one axis of the acceleration sensor.

Some of the advantages that may be achieved by exemplary embodiments and methods of the invention include that, in the surveillance camera performing the tilting operation by using the open loop control method, a variation in the tilt-angle due to gravity, vibration, wind, heat, etc. as time passes after finishing the tilting operation may be instantly (in real time) detected and corrected.

In addition, most of surveillance cameras include a gyro sensor for detecting and correcting shaking of the camera during imaging. In most cases, the gyro sensor itself is not sold separately, but is sold with the acceleration sensor as the speed sensor. Therefore, since the method of maintaining the tilt-angle or the method of controlling the tilting according to the exemplary embodiments and methods uses the acceleration sensor included in the speed sensor with the gyro sensor, it is economically efficient.

Additionally, according to the methods of controlling tilting in accordance with the principles of the invention and exemplary embodiments in a surveillance camera performing the tilting operation by employing an open loop control method, tilting to the command tilt-angle may be normally performed by using the photo-interrupt sensor that is inexpensive.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A method of rotating a surveillance camera having an acceleration sensor and being controllable by a processor to maintain a tilt-angle to conform to a command tilt-angle, the method comprising the steps of:
    (a) moving the surveillance camera tilt to a predetermined command tilt-angle in response to a signal from the processor;
    (b) periodically calculating in the processor estimated tilt-angles by using acceleration values in at least one axis of the acceleration sensor;
    (c) calculating a difference between an estimated tilt-angle of a current period and an estimated tilt-angle of a previous period; and
    (d) when the difference between the estimated tilt-angles exceeds a set limit value, moving the camera to another position to correct the tilt angle according to the difference calculated in step (c).

2. The method of claim 1, wherein surveillance camera has a gyro sensor to detect whether the camera is shaking, and further comprising the steps of:
(e) sending signals from the gyro sensor to the processor to monitor whether the camera is shaking; and
(f) performing steps (c) and (d) only when the processor determines that the surveillance camera is not shaking.

3. The method of claim 1, wherein step (b) comprises:
(b1) reading acceleration values from the acceleration sensor, in each time period;
(b2) performing noise filtering on the acceleration values from the acceleration sensor;
(b3) calculating tilt-angles corresponding to the acceleration values;
(b4) performing an offset correction on calculated tilt-angles; and
(b5) obtaining, as the estimated tilt-angle, an average of the calculated tilt-angles.

4. The method of claim 3, wherein an offset value for performing the step (b4) is calculated by the processor before the operation of tilting the camera to the command tilt-angle.

5. The method of claim 1, wherein step (b) comprises:
(b1) reading acceleration values from the acceleration sensor, in each time period;
(b2) performing noise filtering on the acceleration values from the acceleration sensor;
(b3) calculating tilt-angles corresponding to the acceleration values;
(b4) calculating an average angle of the calculated tilt-angles as the estimated tilt-angle.

6. The method of claim 1, wherein the acceleration values in an X-axis, a Y-axis, and a Z-axis are generated by the acceleration sensor, wherein an acceleration in the Z-axis is equal to an acceleration of gravity when the command tilt-angle is 0 and the acceleration sensor is configured to rotate about the X-axis or the Y-axis as a rotational axis due to the tilting operation.

7. The method of claim 1, wherein the acceleration values in an X-axis, a Y-axis, and a Z-axis are generated by the acceleration sensor, the acceleration sensor is configured to rotate about the X-axis as a rotational axis due to the tilting operation,
the command tilt-angle comprises a first range or a second range of angles,
in step (b), the estimated tilt-angle is calculated according to the acceleration values in the Y-axis when the command tilt-angle is within the first range, and
the estimated tilt-angle is calculated according to the acceleration values in the Z-axis when the command tilt-angle is within the second range.

8. A method of controlling tilting of a surveillance camera having an acceleration sensor and being controllable by a processor to tilt the camera to a command tilt-angle and to control an actual tilt-angle to conform to the command tilt-angle, the method comprising the steps of:
(a) tilting the camera to the command tilt-angle while monitoring whether the operation of tilting to the command tilt-angle is performed by using a photo-interrupt sensor;
(b) after moving the surveillance camera to the predetermined command tilt-angle in response to a signal from the processor, periodically calculating in the processor estimated tilt-angles by using acceleration values in at least one axis of the acceleration sensor;
(c) calculating a difference between an estimated tilt-angle of a current period and an estimated tilt-angle of a previous period; and
(d) when the difference between the estimated tilt-angles exceeds a set limit value, moving the camera to another position for correcting the tilt-angle according to the difference calculated in step (c).

9. The method of claim 8, wherein the photo-interrupt sensor used in step (a) comprises:
a light-emitting device configured to irradiate light in a first direction;
a photo detecting device configured to rotate due to the tilting operation; and
a disc located between the light-emitting device and the photo detecting device in the first direction, and comprising first regions configured to transmit light from the light-emitting device and second regions configured to block the light from the light-emitting device,
wherein the photo detecting device is configured to output logic high signals and logic low signals to the processor by passing through the first regions and the second regions while rotating due to the tilting operation.

10. The method of claim 9, wherein a reference tilt-angle is set according to a location of an end in each of the first regions and the second regions, and a tilt-angle range of each of the first regions and the second regions is set differently from the others.

11. The method of claim 10, wherein the lengths of the first regions and the second regions are different from one another.

12. The method of claim 10, wherein step (a) further comprises performing a correction control when a difference between a reference tilt-angle according to the tilting process and an accumulated tilt-angle in a current period is greater than a reference difference at a time point of detecting that the photo detecting device is positioned at the location of the end in each of the first regions and the second regions.

13. The method of claim 11, further comprising the step of searching for the location of the end in one of the first regions and the second regions by using a combination of an additional forward tilting and an additional backward tilting; and
setting a reference tilt-angle according to a found location of the end as the accumulated tilt-angle in the current period.

14. The method of claim 8, wherein step (b) comprises:
(b1) reading acceleration values from the acceleration sensor, in each time period;
(b2) performing noise filtering on the acceleration values from the acceleration sensor;
(b3) calculating tilt-angles corresponding to the acceleration values; and
(b4) calculating an average angle of the calculated tilt-angles as the estimated tilt-angle.

15. The method of claim 8, wherein acceleration values in an X-axis, a Y-axis, and a Z-axis are generated by the acceleration sensor,
the acceleration sensor is configured to rotate about the X-axis as a rotational axis due to the tilting operation,
the command tilt-angle comprises a first range or a second range,
in step (b), the estimated tilt-angle is calculated according to acceleration values in the Y-axis when the command tilt-angle is within the first range, and the estimated tilt-angle is calculated according to acceleration values in the Z-axis when the command tilt-angle is within the second range.

16. A surveillance camera system comprising:
a surveillance camera having an acceleration sensor;
a processor to generate signals to rotate the camera to a predetermined tilt angle, wherein the processor is configured to:
(a) after the surveillance camera is moved, tilt to a predetermined command tilt-angle in response to a signal from the processor, periodically calculate in the processor estimated tilt-angles by using acceleration values in at least one axis of the acceleration sensor;
(b) calculate a difference between an estimated tilt-angle of a current period and an estimated tilt-angle of a previous period; and
(c) when the difference between the estimated tilt-angles exceeds a set limit value, generate a signal to move the camera to another position for correcting the tilt angle according to the difference calculated in step (b).

17. The surveillance camera system of claim 16, wherein surveillance camera further comprises a gyro sensor configured to detect whether the camera is shaking, and further comprising the steps of
(d) sending signals from the gyro sensor to the processor to monitor whether the camera is shaking; and
(e) performing steps (b) and (c) only when the processor determines that the surveillance camera is not shaking.

18. The surveillance camera system of claim 16, wherein step (a) comprises:
(a1) reading acceleration values from the acceleration sensor, in each time period;
(a2) performing noise filtering on the acceleration values from the acceleration sensor;
(a3) calculating tilt-angles corresponding to the acceleration values; and
(a4) calculating an average angle of the calculated tilt-angles as the estimated tilt-angle.

19. The system of claim 18, further comprising a photo-interrupt sensor including
a light-emitting device to irradiate light in a first direction;
a photo detecting device rotatable due to the tilting operation; and
a disc located between the light-emitting device and the photo detecting device in the first direction, and comprising first regions to transmit light from the light-emitting device and second regions to block the light from the light-emitting device,
wherein the photo detecting device is configured to output logic high signals and logic low signals to the processor by passing through the first regions and the second regions while rotating due to the tilting operation.

* * * * *